July 29, 1930.  E. M. BEEBE  1,771,607

MANIFOLD

Filed Nov. 11, 1929

INVENTOR
Edward M. Beebe
BY Loyal J. Miller
ATTORNEY

Patented July 29, 1930

1,771,607

UNITED STATES PATENT OFFICE

EDWARD M. BEEBE, OF SHAWNEE, OKLAHOMA

REISSUED

MANIFOLD

Application filed November 11, 1929. Serial No. 406,444.

My invention relates to a pipe line manifold having a valve adapted for selective positioning.

The objects of my invention are to provide a device of this class which is new, novel, practical and of utility; which will be adapted to dispose upon a pipe line and to receive discharges of fluid from same; which will be provided with two outlets, each respectively adapted for connection to an outlet pipe; a device which will contain a valve member, operable from said manifold's exterior, by means of which member, incoming fluid may be directed to discharge through a selected one of said manifold's outlets or through both said outlets simultaneously; a device which will be relatively inexpensive to manufacture; which may be quickly attached upon a pipe line and as quickly detached; which will be positive in action; a device the traveling valve member of which will have a removable face, resistant to wear; which may be easily and cheaply replaced; a device primarily designed for severe use upon a mud circulating system of a well being drilled by rotary tools; yet which may be found useful in many other lines of activity; which will be efficient in accomplishing all the purposes for which it is intended.

It is usual in mud circulating systems for a pair of stand-pipes to arise from an outlet line common to two pumps, each of said stand-pipes provided with a valve, and each provided with a separate high pressure hose leading to a common goose neck or coupling means for attaching both said hose lines to the drill stem. It is usual to use only one such hose line at a time, and to hold the other in reserve, for emergency use in the event of breadage or of serious leakage in the first hose. At times however it is desired to use both said pumps and both said pressure hose lines simultaneously.

It is the purpose of this application to disclose a valve manifold situate, by means of a proper connection, upon an outlet common to two pumps, said manifold housing a valve adapted for directing as may be desired the charge received from the pump line into a selective one, or into both the standpipes leading therefrom, each stand pipe affording a connection for one of said high pressure hose lines.

Figure 1:
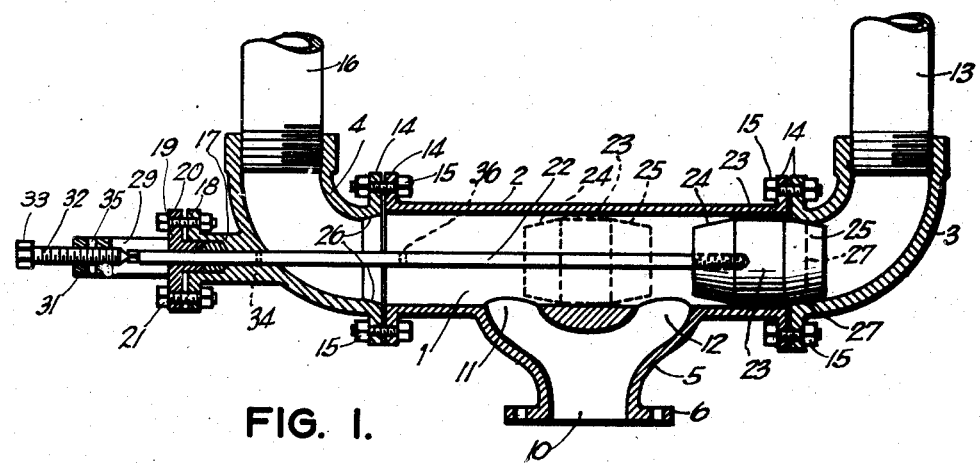
Figure 2:
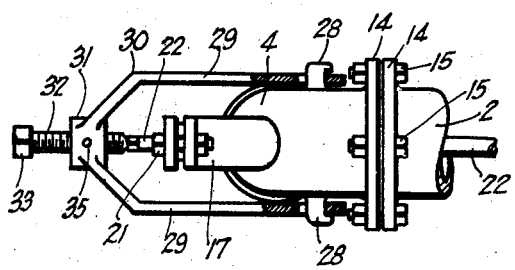
Figure 3:
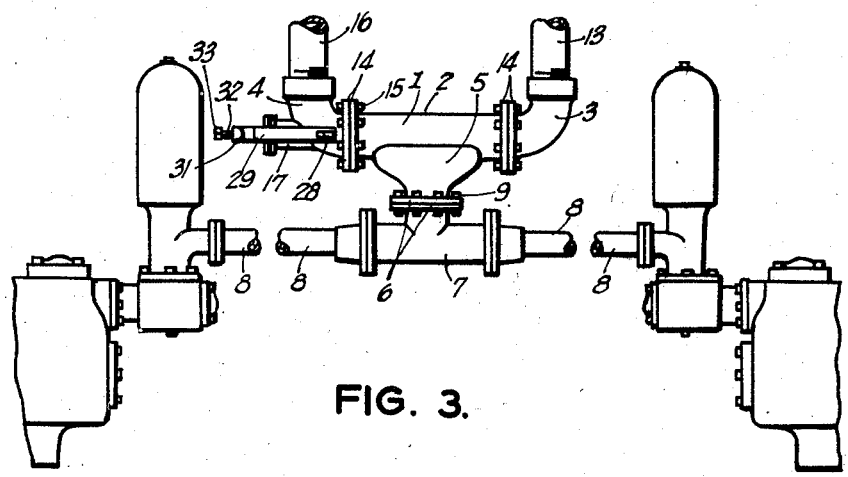

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a sectional elevational view of my device, two fragmentary stand-pipes disposed thereon;

Figure 2 is a fragmentary perspective view, partially in section, of the valve control mechanism; and Figure 3 is an elevational view of the device positioned upon a broken section of pump outlet lines.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One practical embodiment of the invention as illustrated in the drawings comprises:

A manifold 1, having a central body member 2, and oppositely disposed upstanding end portions respectively 3 and 4.

Said body member 2 is mainly cylindrical, is hollow, and is provided upon its central underside with a down standing portion 5, flanged as shown at 6 for connection with a similarly flanged automatic valve 7 upon a pump discharge line 8 therebelow. Said flanged portions 6 form a leak proof connection held by a plurality of bolts 9 therethrough. Said portion 5 is provided with a central bore shown as 10 for receiving a fluidic discharge from said valve 7, and is also provided with two passage ways shown as 11 and 12 which lead respectively from said bore 10 to the interior of said member 2. Said passage way 11 opens into member 2 at a point somewhat to the left of said member's center, while said passage 12 opens thereinto at a point somewhat to the right of said center.

It is to be understood that said member 5 with my manifold thereabove may be positioned directly upon any fluid supply line, if desired, without the intervening said valve member 7 therebetween.

Said end member 3 forms an elbow, is threaded at its upper end portion for the reception of the lower end of a usual standpipe 13, and is attached to said member 2 in leak proof manner by the annular flanges 14 and plurality of bolts 15, therethrough.

Said member 4, likewise forms an elbow, threadedly receives the end of a usual standpipe 16, and like member 3, is attached to said member 2 by flanges 14 and bolts 15.

Said member 4 is provided exteriorly at a central portion of the turn of its elbow, with an extending boss 17, which is provided at its free end with an annular flange 18. Boss 17 is also provided within its free end portion with a recess for housing packing and the extending portion of a packing gland 19. Gland 19 is annularly flanged as shown at 20. A plurality of through bolts 21 secure the gland 19 to boss 17 in adjustable manner. A bore axially through said gland 19, a packing and boss 17 affords a hermetically sealed slide bearing for the cylindrical rod 22, upon the threaded end of which, within said body member 2, is disposed the valve head 23. The said valve head 23 is somewhat cylindrical in form, is adapted to slidably fit within the cylindrical portion of the said member 2, and its two opposite end portions are tapered as shown respectively at 24 and 25, to seat hermetically within the respective valve seats 26 and 27, formed within the respective flanged end portions of said members 3 and 4.

A pair of lugs shown as 28 project, one each, from opposite sides of the said member 4. Upon these lugs are removably hooked the slotted free ends of the two legs 29 of the bail or yoke member 30. At their outward end portion said legs 29 converge upon and form an annular, interiorly threaded ring 31. Passing through said ring 31 is a threaded set screw 32, a head 33 upon its extending end. At its end opposite head 33, the screw 32 is beveled to contact and fit the similarly beveled seat for same in the end of the said cylindrical valve rod 22.

In the operation of the device, when it is desired to direct the fluid discharge from pipe 8 into and through the said standpipe 16, the valve 23, will be positioned by the rod 22, with its tapered end portion 25 seated in the said valve seat 27, hermetically sealing the passage through said elbow member 3. The set screw 32 and rod 22 will insure the proper seating of the said tapered portion 27, as is shown in Figure 1. Should it be desired to direct the said discharge into both said standpipes 13 and 16, the set screw 32 will be removed, the free end of the rod 22 will be drawn through the said ring 31 until the valve member 23, assumes the position as shown by the dotted lines in Figure 1. In this position, a perforation shown as 34 through said rod 22 will aline with the perforation shown as 35 through the said ring 31, and a small pin will be inserted in and through said alined perforations. Should it be desired to direct the said discharge through only the standpipe 13, rod 22 will be further withdrawn through ring 31 until the beveled valve end 24 seats in the said seat 26 within said member 4, at which time, the perforation shown as 36 through said rod 22 will aline with said perforation 35, and a pin as previously outlined, will be inserted in said perforations 35 and 36.

It may develop in practice, that a train of valve positioning means such as that shown at the left of the valve member 23, may be found desirable for the right of said valve member 23, and applicant desires to reserve the right to make use of such application if it is found desirable. It will be obvious to those familiar with the art that the pressure of the liquid which is being discharged through either of said pipes 13 or 16, will tend to seat more firmly the valve member 23 into the passageway opposite that of the discharging member.

It will also be noted that the said valve head 23, lends itself readily to replacement, or to the refacing of its said beveled valve ends, 24 and 25.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention, what is claimed and desired to be secured by Letters Patent, is:

1. A device, as described, embodying a hollow cylindrical manifold having a lower central inlet and two upper end outlets for liquid, said outlets comprising removable end sections of the manifold, each of said sections having an annular valve seat adjacent an end of the manifold, a cylindrical valve member snugly and slidably fitting the interior of said manifold, and means for selectively seating said valve member in said seats and for retaining said valve member medially in said manifold.

2. A device, as described, embodying a hollow cylindrical manifold having a lower central inlet and two upper end outlets for liquid, said manifold having removable end sections, each of said sections having an annular valve seat adjacent an end of the manifold, a cylindrical beveled ended valve member snugly and slidably fitting the interior of said manifold, and means for selectively seating said valve member in said seats and for retaining said valve member medially in said manifold.

3. A device, as described, embodying a hollow cylindrical manifold having a lower central inlet and two upper end outlets for liquid, said outlets comprising removable end sections of the manifold, each of said sections having an annular valve seat adjacent an end of the manifold, a cylindrical valve member snugly and slidably fitting the interior of said manifold, a rod attached to said valve member axially, said rod extending longitudinally and adapted to hermetically slide through the end of said manifold, and means for securely positioning said rod in varying longitudinal positions.

4. A device, as described, embodying a hollow cylindrical manifold having a lower central inlet and two upper end outlets for liquid, said manifold having removable end sections, each of said sections having an annular valve seat adjacent an end of the manifold, a cylindrical beveled ended valve member snugly and slidably fitting the interior of said manifold, a rod attached to said valve member axially said rod adapted to hermetically slide through the end of said manifold, and means including a yoke for securely positioning said rod in varying longitudinal positions.

5. A device, as described, having, in combination, a hollow cylindrical manifold having a lower central inlet and two upper end outlets for liquid, said manifold having removable end sections, each of said sections having an annular valve seat adjacent an end of the manifold, a cylindrical beveled ended valve member snugly and slidably fitting the interior of said manifold, a rod attached to said valve member axially, said rod adapted to hermetically slide through the end of said manifold, and means including a yoke for securely positioning said rod in varying longitudinal positions.

6. In a device, as described, the combination with a hollow, cylindrical manifold having a lower central inlet, and two upper outlets for liquid, said outlets comprising removable end sections of the manifold, each of said sections having an annular valve seat adjacent an end of said manifold, a cylindrical beveled ended valve member snugly and slidably fitting the interior of said manifold, a rod attached to said valve member axially, said rod extending longitudinally and adapted to hermetically slide through the end of said manifold, and means including a yoke for securely positioning said rod in varying longitudinal positions.

7. In a device as described, the combination with a hollow cylindrical manifold having a lower central inlet and two upper end outlets for liquid, and having removable end sections, each of said sections having an annular valve seat adjacent an end of the manifold, of a cylindrical beveled ended valve member snugly and slidably fitting the interior of said manifold, a rod attached to said valve member axially said rod extending longitudinally and adapted to hermetically slide through the end of said manifold, and means including a yoke for securely positioning said rod in varying longitudinal positions.

8. In a device, as described, the combination with a hollow cylindrical manifold having a lower central inlet and two upper end outlets for liquid and having removable end sections, each of said sections having an annular valve seat adjacent an end of the manifold, a cylindrical beveled ended valve member snugly and slidably fitting the interior of said manifold, of a rod attached to said valve member axially, said rod extending longitudinally and adapted to hermetically slide through the end of said manifold, and means including a yoke for securely positioning said rod in varying longitudinal positions.

EDWARD M. BEEBE.